No. 818,071. PATENTED APR. 17, 1906.
J. A. BEAN.
RIDING CULTIVATOR.
APPLICATION FILED SEPT. 25, 1905.
2 SHEETS—SHEET 1.
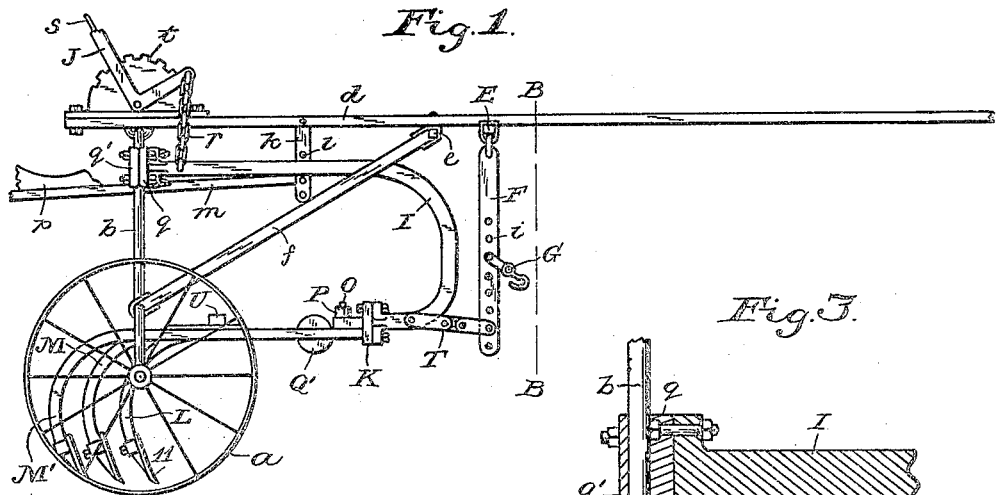
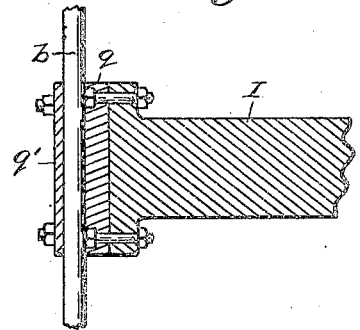
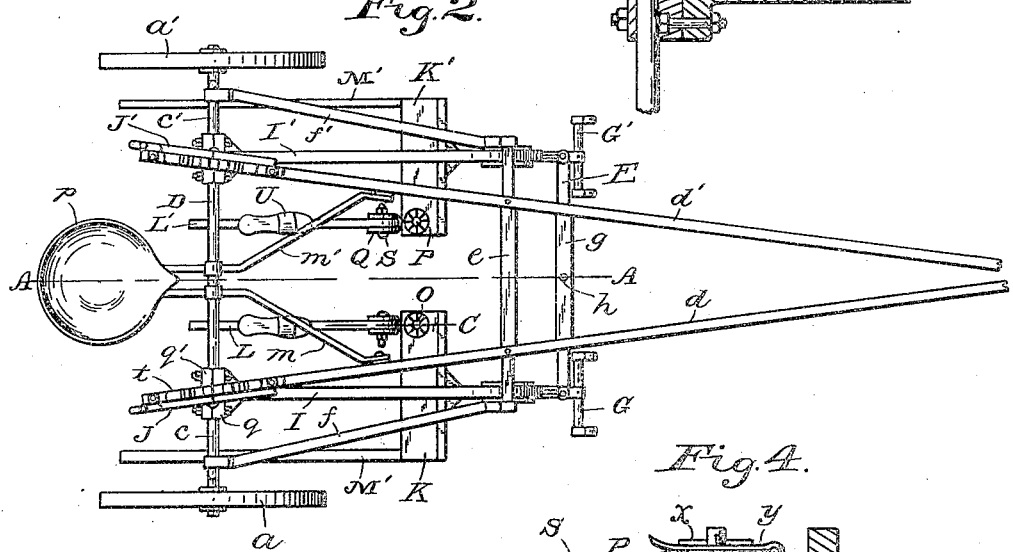
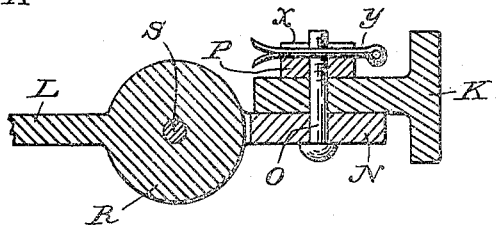
Witnesses:
Wm L Thompson
Stella Snider.
Inventor:
Joseph A. Bean,
by E. T. Silvius,
Attorney.

No. 818,071. PATENTED APR. 17, 1906.
J. A. BEAN.
RIDING CULTIVATOR.
APPLICATION FILED SEPT. 25, 1905.
2 SHEETS—SHEET 2.
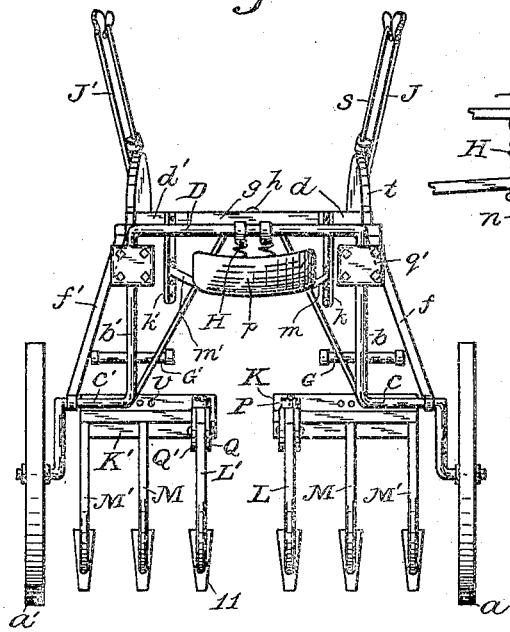
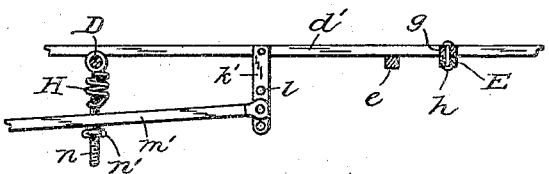
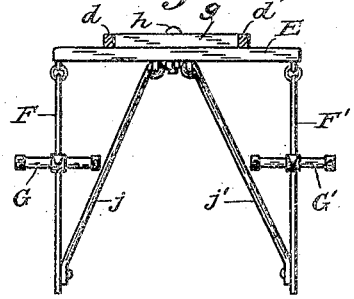
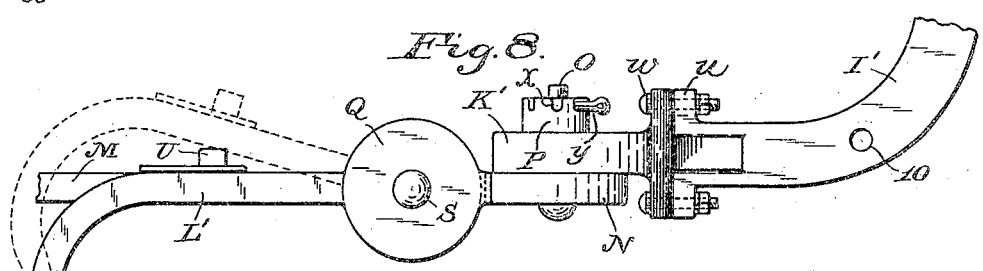
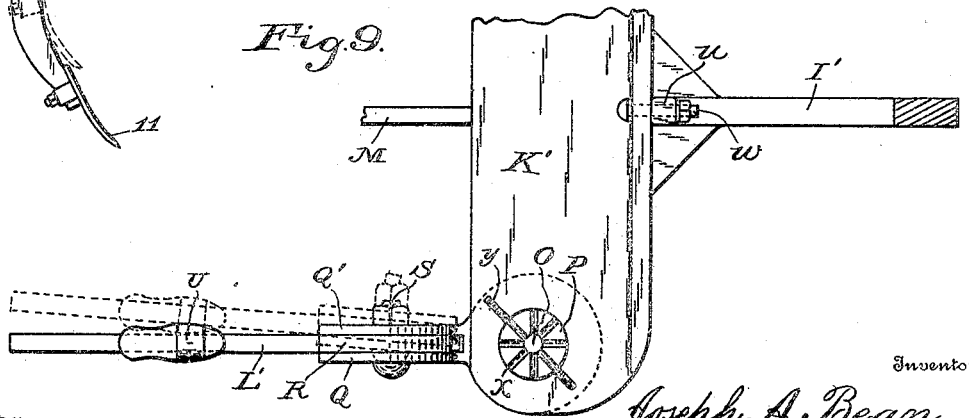
Witnesses:
W. T. Thompson
Stella Snider
Inventor:
Joseph A. Bean,
by E. T. Silvius,
Attorney.

UNITED STATES PATENT OFFICE.

JOSEPH A. BEAN, OF FRANKLIN TOWNSHIP, HENDRICKS COUNTY, INDIANA.

RIDING-CULTIVATOR.

No. 818,071.        Specification of Letters Patent.        Patented April 17, 1906.

Application filed September 25, 1905. Serial No. 279,874.

*To all whom it may concern:*

Be it known that I, JOSEPH A. BEAN, a citizen of the United States, residing in Franklin township, in the county of Hendricks and State of Indiana, have invented new and useful Improvements in Riding-Cultivators; and I do declare the following to be a full, clear, and exact description of the invention, reference being had to the accompanying drawings, and to the characters of reference marked thereon, which form a part of this specification.

This invention relates to farm implements that are designed to be used for cultivating growing corn or other grain or vegetables that may be planted in rows, the invention having reference particularly to cultivators in which the shovels may be adjusted and in which a pair of the shovels nearest to the rows may be controlled by the driver of the implement.

Objects of the invention are to provide means in cultivators for elevating the gangs of cultivator-shovels or permitting them to descend uniformly or so that all of the shovels shall move equal distances into or out of the soil, to provide means for guiding and controlling the forward shovels, which have portions thereof that operate close to the row that may be worked or cultivated, and to provide simple and relatively inexpensive construction in cultivators while embodying the above-mentioned improvements and which shall be durable and economical in use.

With the above-mentioned and minor objects in view the invention consists in a riding-cultivator having two gangs of cultivator-shovels, one shovel of each gang being independently movable vertically and also laterally with respect to the other shovels of the gang, and means for elevating or permitting each gang of shovels to descend uniformly; and the invention consists, further, in the novel parts and in the combinations and arrangements of parts, as hereinafter particularly described and claimed.

Referring to the drawings, Figure 1 is a side elevation of the improved implement with the ends of the tongue and controlling-levers and also the driver's seat broken away; Fig. 2, a top plan of the implement with the end of the tongue broken off; Fig. 3, a fragmentary vertical sectional view showing a portion of the arch and parts connected therewith; Fig. 4, a fragmentary vertical sectional view on the line C in Fig. 2, showing the pivotal supports of an independently-movable shovel; Fig. 5, a rear elevation of the implement; Fig. 6, a fragmentary sectional view on the line A A in Fig. 2; Fig. 7, a fragmentary sectional view on the line B B in Fig. 1; Fig. 8, a fragmentary side elevation showing an independently-movable shovel and its supports, and Fig. 9 a top plan of the elements shown in the preceding figure.

Similar reference characters in the different figures of the drawings designate corresponding elements or features.

An implement embodying the invention comprises a pair of carrying-wheels $a$ and $a'$, an arch D, the central main part of which is horizontal and having two vertical side parts $b$ and $b'$ and two horizontal parts $c$ and $c'$, which have portions thereof that extend vertically and terminate as horizontal axles in the wheels. A pair of frame members $d$ and $d'$ are attached to the upper parts of the arch and extend convergently forward and form the tongue for guiding the implement. A cross-piece $e$ is secured to the members $d$ and $d'$ and has two axle-braces $f$ and $f'$ attached thereto, that are also attached to the arch near the axles.

Draft-rigging comprise a cross-bar $g$, that is joined to the members $d$ and $d'$ forward of the cross-piece $e$, and a doubletree E, connected to the cross-bar $g$ by a pivot $h$, there being two hangers F and F' attached to the ends of the doubletree and depending therefrom, the hangers having holes $i$ therein, and swingletrees G and G' are connected to the hangers by means of the holes. The hangers serve as drop extensions of the doubletree and are braced by rods $j$ and $j'$, that are attached to the lower parts of the hangers and to the middle portions of the doubletree.

Between the arch and the cross-piece $e$ two frame members $k$ and $k'$, having pivot-holes $l$ therein, are attached to the members $d$ and $d'$ and extend downwardly therefrom, there being two seat-beams $m$ and $m'$ pivoted to the members $k$ and $k'$ and extending rearwardly and convergently below the arch D. A screw-rod $n$, having a nut $n'$ thereon, is connected to each seat-beam and also to a spring H, that is supported by the arch D, the nut providing for vertical adjustment of the beam, which may also be adjusted at its forward end by means of the different holes *l*. A seat *p* for carrying the driver and operator is mounted on the beams *m* and *m'* rearward of the arch D.

Two arms I and I' each have a bearing *q* removably attached thereto and provided with a cap *q'*, whereby the arms are connected to the upright parts *b* and *b'* of the arch, so as to slide and therefore be adjustable vertically, the arms being guided by the arch and hung to links *r*, that are connected to levers J and J', having latches *s* coöperating with quadrants *t*, the latter being mounted on the frame members *d* and *d'* and their bases having the levers pivoted thereto. The arms I and I' extend forwardly and thence downwardly behind the hangers F and F' and thence rearwardly and have abutments *u*, to which gang-frames K and K', having bolt-holes *v*, are adjustably secured thereby by means of bolts *w*, the gang-frames therefore being movable either one toward or away from the other one. Each gang-frame has an independently-movable shovel-arm L or L' attached thereto and also two relatively fixed shovel-arms M and M', which may be secured to the gang-frame in any suitable manner, the shovel-arms L or L' being shorter than the others, which are also of different lengths. The shovel-arms L and L' are each connected to the inner end of a gang-frame by means of a disk N, that is connected horizontally to the gang-frame by a pivot O, on which is a nut P, having radial grooves *x* in the top thereof to receive a cotter *y*, that extends through the bolt removably for locking the nut to the bolt, the nut being designed to be used in taking up lost motion closely as well as for connecting the disk N to the gang-head. Two disks Q and Q' are secured to the disk N vertically, and each shovel-arm L or L' has an integral disk R, that is placed between the two disks Q and Q' and connected thereto by a pivot S, so that the shovel-arm may be moved both on a vertical pivot and on a horizontal pivot.

The arms I and I' each have a hole 10 in the lower forward portion thereof, whereby links are connected thereto, the links being connected also to the hangers F and F', so that the draft connections are direct with the arms that carry the gang-frames by which the shovels are carried.

Each shovel-arm L and L' has a foot-loop U on the top thereof to receive the driver's feet for guiding the shovels 11 of suitable forms that are carried thereby.

In order to prevent the shovels 11 from dragging when moving the implement on highways, the shovel-arms L and L' may be placed temporarily upon the adjacent shovel-arms, or they may be otherwise suitably supported.

In practical use two horses should be hitched to the implement, and the driver should sit on the seat *p* with his feet in the loops U. The levers J and J' should be manipulated so as to allow the arms I and I' to descend sufficiently to permit of the shovels to enter the soil to the desired depth. The driver should watch the row of corn and with his feet should guide the shovel-arms L and L' more or less toward the row and into the soil as may be desired to obtain the best results. The large disks Q, Q', and R will prevent looseness of the joint, and when lost motion appears in the joint with the gang-frame the cotter *y* may be removed and the nut P slightly turned on the pivot-bolt O, after which the nut may be locked to the bolt by the cotter. The term "shovels" is intended to include any suitable form of cultivator blades or teeth.

Having thus described the invention, what is claimed as new is—

1. A cultivator including an arch, a pair of arms connected movably to the sides of the arch, means for supporting and controlling the movements of the arms, and shovel-arms supported by means of the movable arms.

2. A cultivator including an arch, a pair of arms connected movably to the sides of the arch and provided with means connected to the arms for the guidance thereof, means for supporting the arms, and shovel-arms supported by means of the movable arms.

3. A cultivator including an arch having upright side parts, a pair of arms movable vertically on and also swinging laterally about the side parts of the arch and supporting shovel-arms, means for supporting and controlling the movements of the arms vertically, and means for guiding the movable arms laterally.

4. A cultivator including an arch, frame members mounted on the arch, a pair of arms movable vertically on the arch and also swinging horizontally, levers mounted on the frame members and connected with and controlling the vertical movements of the movable arms, means supported by the frame members connected with and controlling the horizontal swinging movements of the movable arms, and shovel-arms supported by means of the movable arms.

5. A cultivator including an arch having upright side parts, a pair of arms having guide-bearings attached thereto in engagement with the side parts of the arch and provided with caps also in engagement with the side parts and attached to the guide-bearings, frame members mounted on the arch, levers mounted on the frame members and connected with and adjustably supporting the arms so that the guide-bearings may move on the side parts, latches for the levers, and cultivator-shovels having arms supported by the movable arms.

6. A cultivator including an arch having upright sides, a pair of arms mounted movably on the sides of the arch, means for supporting and controlling the movements of the arms, a pair of gang-frames secured fixedly to the arms and provided each with a vertical pivot, a horizontal disk mounted on the pivot and having a vertical disk attached thereto provided with a horizontal pivot, a shovel having an arm provided with a vertical disk mounted on the horizontal pivot of the hereinbefore-mentioned vertical disk, and a plurality of shovels having arms fixed to the gang-frames.

7. A cultivator comprising an arch, carrying-wheels, frame members attached to the arch and forming a tongue, a doubletree pivotally supported by means of the frame members, hangers depending from the doubletree, braces attached to the hangers and also to the doubletree, swingletrees connected to the hangers, curved arms connected movably to the arch and also to the hangers, levers mounted on the frame members and connected with the curved arms, gang-frames attached to the curved arms, shovel-arms attached fixedly to the gang-frames, shovel-arms connected pivotally to the gang-frames and provided with controlling and adjusting means, cultivator-shovels attached to the shovel-arms, and a seat supported by the arch and guided by means of the frame members.

In testimony whereof I affix my signature in presence of two witnesses.

JOSEPH A. BEAN.

Witnesses:
E. R. ROBARDS.
F. M. OSBORN.